United States Patent [19]

Schmitt et al.

[11] 4,238,592

[45] Dec. 9, 1980

[54] METHOD FOR PRODUCTION OF DUROPLASTIC, SINGLE-COMPONENT POLYURETHANES

[75] Inventors: Felix Schmitt, Herten; Günter Kriebel, Herne, both of Fed. Rep. of Germany

[73] Assignee: Chemische Werke Huls AG, Recklinghausen, Fed. Rep. of Germany

[21] Appl. No.: 926,423

[22] Filed: Jul. 20, 1978

[30] Foreign Application Priority Data

Jul. 20, 1977 [DE] Fed. Rep. of Germany ....... 2732775

[51] Int. Cl.$^3$ .................. C08G 18/80; C08K 5/02; C08K 5/07; C08K 5/10
[52] U.S. Cl. .................. 528/45; 260/30.4 N; 260/31.8 R; 260/32.8 N; 260/33.6 UB; 260/33.8 UB; 428/379; 528/73; 528/81
[58] Field of Search .................. 528/45, 73, 81

[56] References Cited

U.S. PATENT DOCUMENTS

| | | | |
|---|---|---|---|
| 3,583,943 | 6/1971 | Weber et al. | 528/45 |
| 3,830,785 | 8/1974 | Matsui et al. | 528/45 |
| 3,846,378 | 11/1974 | Griswold | 528/45 |
| 3,857,818 | 12/1974 | Frizelle | 528/45 |
| 4,046,744 | 9/1977 | Jenkins | 528/45 |
| 4,089,844 | 5/1978 | Tsou | 528/45 |
| 4,151,152 | 4/1979 | Schmitt et al. | 528/45 |

*Primary Examiner*—H. S. Cockeram
*Attorney, Agent, or Firm*—Oblon, Fisher, Spivak, McClelland & Maier

[57] ABSTRACT

A method for the production of single-component polyurethane lacquers which comprises:

reacting (1) a polyester having an OH-functionality of at least 2, an OH-count of 70–150 mg KOH/g and a molecular weight of about 800–2500, derived from (A) an acid selected from the group consisting of ortho-, meta-, and para-dicarboxylic acids, 1,2,5-bezenetricarboxylic acid, 1,3,5-benzenetricarboxylic acid, $C_1$–$C_4$ alkyl esters thereof and mixtures thereof and (B) a glycol with a heteroatom-free chain which chain consists of 5–8 carbon atoms with (2) a dimethylketoxime-blocked cycloaliphatic polyisocyanate; wherein the equivalence ratio of said OH groups to said blocked isocyanate groups is 1.0:0.7 to 1.0:1.1.

25 Claims, No Drawings

METHOD FOR PRODUCTION OF DUROPLASTIC, SINGLE-COMPONENT POLYURETHANES

BACKGROUND OF THE INVENTION

1. Field of the Invention

The present invention relates to a method for the production of single-component polyurethane lacquers for metal-strap lacquering.

2. Description of the Prior Art

Polyurethanes would satisfy the essential requirements for use as coating for production of lacquered metal-strap goods. Thus they exhibit excellent surface hardness and resistance to scraping and chemicals. Further, polyurethanes, produced by means of aliphatic or cycloaliphatic polyisocyanates, yield lacquer films which are distinguished, in addition, by outstanding resistance to weathering.

Polyurethanes, however, are practically unused in the strap-lacquering sector since, on account of the reaction mechanism, they entail a two-component application which leads in metal-strap lacquering to great, in many cases unsurmountable difficulties. Moreover, it has thus far not been possible to achieve with sufficiently good surface hardness the good deformation values readily obtainable today with PVC-organosols and PVDF-systems. There has been no shortage of attempts to convert, especially for the general lacquering sector, the above two-component system into a pseudo-single component system. For this, in principle, the two following procedures have been described:

1. Resins with isocyanate end groups are produced on the basis of polyethers and polyesters. These resins after application react with the moisture in the air to form cross-linked, high molecular weight polyether-or polyester-polyureas. The second component in this case is thus water. From this fact arises also the drawbacks of this, in principle, elegant method. Care must be taken to exclude all water before application. Only water-free resins, solvent, pigments etc. are to be used. Since these requirements can be satisfied only with great technological difficulty, the use of such products has remained limited heretofore.

2. The second way proceeds from the general fact that many organic bonds tend to split up again from a certain temperature upwards. A series of substances has been found which form stable compounds with isocyanate groups at room temperature which split again into isocyanate groups at elevated temperatures between 100° and 200° C. as a rule. Such products are known as isocyanate yielders or as blocked or masked isocyanates in the technical literature. In the presence of hydroxyl groups no reaction of the isocyanate groups can occur at room temperature, so that the single-component process becomes possible.

It is also by method 2 of the state-of-the-art that 2-butanone oxime-blocked isocyanates are used as cross-links for hydroxylacrylate (of U.S. Pat. No. 3,694,389). The disadvantage of hydroxylacrylates as polyol components for polyurethane strap-coating lacquers is in the poor deformability. Good deformability is an indispensable prerequisite for the suitability of coatings for the metal-strap lacquering sector. Moreover, generally suitable polyols are polyethers and higher molecular weight epoxides. These two groups of products, however, on account of their poor weathering characteristics are not recommended for combination with aliphatic and cycloaliphatic isocyanates.

From DT-OS No. 23 46 818 are also known combinations of OH-group-containing polyesters with ε-caprolactam-blocked polyisocyanates. On account of the high necessary object temperature of about 240° C., such lacquers are to be pigmented only with very thermostable pigments. Pigments of high thermostability, however, are not usable without reservation, because of toxicological reasons on account of their heavy metal base. If, however, the requisite object temperature can be reduced below 220° C., plenty of pigments are available which are not hazardous to health.

SUMMARY OF THE INVENTION

Surprisingly it has been possible to find polyurethane raw materials arising from combinations of special hydroxyl group-containing polyesters with blocked cycloaliphatic polyisocyanates and satisfying all essential requirements for use in metal-strap lacquering. To be particularly emphasized are extremely good deformability with good surface hardness and very good weathering qualities. Good deformability is even then obtainable when such lacquers are modified by the addition of pyrolytically obtained silicic acids to semiglossy or matt surfaces.

Object of the invention, therefore, is a method for production of single-component polyurethane lacquers for metal-strap lacquering, wherein on the one hand polyesters with an OH-functionality of at least 2, an $OH$-count of 70–150 mg KOH/g and a molecular weight of about 800–2500, of o-, m- and/or p-benzenedicarboxylic acids and/or 1,2,5- or 1,3,5-benzenetricarboxylic acids or their alkyl esters with 1–4 C-atoms with trifunctional alcohols and/or glycols are reacted with, on the other hand, dimethylketoxime-blocked cycloaliphatic polyisocyanates with an equivalence ratio of OH-groups to blocked isocyanate groups of 1.0:0.7 to 1.0:1.1, in particular, 1.0:1.0.

DESCRIPTION OF THE PREFERRED EMBODIMENTS

As trivalent alcohols for the production of polyesters, trimethylolpropane, trimethylolethane and triethanol propane are particularly suited. On the glycol side those are especially suited which have heteroatom-free chains and which chain consists of 5–8, in particular 5–6 C-atoms, e.g., 1,5-pentanediol, 1,6-hexanediol, 2,2,4- or 2,4,4-trimethylhexanediol and 3-methylpentanediol.

The OH-count of the polyesters with an OH-functionality of at least 2, lies in the range from 70 to 150, in particular 100 mg KOH/g. The molecular weight lies between 800 and 2500.

Suitable polyisocyanates are, in particular, 3,4- and/or 2,6-hexahydrotoluylenediisocyanate, o-, m-, and p-hexahydroxylylenediisocyanate, 3-isocyanatomethyl-3,5,5-trimethylcyclohexylisocyanate (IPDI) and 4,4'-dicyclohexylmethanediisocyanate.

Further, the following polyisocyanate-adducts are suited: Polyisocyanates based on the aforementioned or mixtures of the aforementioned diisocyanates and resulting from an addition reaction with OH-group-containing products with a least functionality of 2, where the equivalence ratio of OH:NCO is greater than 1:1.2, preferably 1:1.5 to 1:2; polyisocyanates produced by reaction of the aforementioned diisocyanates with water during formation of urea and/or biuret structures; polyisocyanates obtained through oligomerization of the aforementioned diisocyanates to dimers, trimers or pentamers.

Obviously, mixtures of the different polyisocyanates can also be used.

Suitable solvents for formulating the polyurethanes of the invention are: ketones, like methylisobutylketone, cyclopentanone, cyclohexanone, isophorone, trimethylcyclohexanone, etc.: aromatics, such as benzene, toluene, chlorobenzene, aromatic mixtures from $C_8$ to $C_{11}$ etc.: cyclic ethers, like tetrahydrofuran, dioxane, etc.: esters, like n-butylacetate, isopropyl acetate, cyclohexyl acetate, ethylglycol acetate, methyl glycol acetate, butylglycol acetate.

To the already mentioned advantages of the method of the invention are added, combined with a reduction of the necessary object temperature, an energy saving as well as an increased environmental protection effect. A very special advantage is the now possible increase in the strap velocity for the same cost in energy.

As measure for the concept of extreme deformability there can be invoked in particular the T-bend test (Test Norms ocf the European Coil Coating Association), carried out on 0.8 mm thick, lacquered iron strips. The strip with lacquered side out is bent with different radii of curvature at 180° C., where the radii of curvature are indicated according to whether no (measurement number 0) or several (measurement number >0) unlacquered strips of the same thickness are used as spacers in the bending. The measurement number reveals under what conditions the bending can still be carried out without producing cracks visible at a magnification of 10X.

As measure of the resistance of the lacquer to mechanical damage (surface hardness) there can be used, in particular, the lead pencil hardness according to the test norm of the European Coil Coating Association and the pendulum hardness according to DIN 53 157. Criteria and expressions with regard to outside weathering qualities can be obtained through short weathering tests, e.g. in the weatherometer.

EXAMPLE 1

A. Production of a hydroxyl-group-containing polyester

In a suitable glass esterifying apparatus 10 Mol (1940 g) of terephthalic acid dimethyl ester with 8 Mol (1280 g) of 2,2,4- or 2,4,4-trimethylhexanediol-1,6- isomer mixture (about 40:60) as well as 3 Mol (402 g) of 1,1,1-trimethylol propane were subjected to the transesterification. This was catalyzed with 0.1 wt.% of dibutyltin oxide. The reaction components were slowly warmed while being stirred, until at about 140° C. a homogeneous melt was formed. From that point the temperature was raised further to 185° C. when the first methanol cleavage occurred. In the course of about 10 hours the transesterification temperature was increased to 220° C. max., with practically no more methanol being given off in the last hour at 220° C. During the entire transesterification a weak flow of nitrogen bubbled through the reaction medium in order to better carry off the methanol condensation product. For separation of volatile fractions the temperature was lowered to 200° C. after the transesterification and for 30 min. volatile fractions were removed from the polyester melt in a vacuum of 1-2 mm Hg.

Chemical and physical characteristics of the polyester:

OH-count: 93 mg KOH/g
Acid count: <1 mg KOH/g
Molecular Weight: 1650
Glass transition Temp.: −5° C. to +8° C.

The polyester, in view of its later use as resin component for formulating polyurethane lacquer for strap coating, was dissolved in ethylglycol acetate/Solvesso 150 (1:2) to a 60% solution. (Solvesso 150 is a mixture of aromatics with boiling range 177°–206° C.).

B. Production of the Dimethylketoxime-Blocked Isocyanate Component 500 g of a mixture consisting of 15 wt.% trimer (isocyanurate) and about 85% of a dimer (uretdione) of isophoronediisocyanate were dissolved in 440 g of a mixture of ethylglycol acetate/Solvesso 150 (1:2) and then converted with 159 g of dimethylketoxime stirred in a little at a time. The mixture of oligomers of isophoronediisocyanate was produced in a straightforward manner under the catalytic influence of tributyl phosphine and subjected to a vacuum distillation process in order to separate monomeric isophoronediisocyanate. The content of monomeric isocyanate after the distillation process lay below 1 wt.%, the NCO content of the oligomer mixture was found to be 18.4. In the blocking of the free NCO groups of the oligomer mixture the reaction mixture warmed up to about 55° C.

C. Lacquer Formulation

On the basis of the resins described under A and B a polyurethane lacquer for strap lacquering was formulated according to the following recipe:
49.2% polyester solution, see under A
13.4% blocked isocyanate adduct, see under B
32.3% white pigment, titanium dioxide (PVK 19)
3.9% butylglycol acetate
1.2% vehicle (silicone base)

D. Lacquer Testing 0.8 mm thick aluminum sheets were coated with a white lacquer described under C and hardened for 55 sec. in a blower hotbox at 310° C. air temperature. The maximum object temperature was 220° C.

Test Results
Film thickness: 25 μm
Hardness according to König (DIN 53 157): 173
Hardness according to Buchholz (DIN 53 153): 100
Lead pencil hardness: 2H
Penetration according to Erichsen (DIN 53 156): >7 mm
Grid cut (DIN 53 151): 0
T-bend (ECCA): 0

EXAMPLES 2–4

In analogy to Example 1 and using the polyester solution 1A described there, baked-on lacquers were formulated. Various acetone-oxime-blocked polyisocyanates found application here.

B. Production of Blocked Polyisocyanates

EXAMPLE 2

231.6 g of 4,4′-dicyclohexylmethanediisocyanate was dissolved in 160 g of xylene and 80 g of ethylglycol acetate and gradually reacted in the temperature range from 20° C. to 67° C. with the stoichiometric amount of dimethylketoxime (128.4 g). After the entire amount of blocking agent was reacted with the isocyanate groups, the content of free isocyanate groups was 0.25% NCO. The latent NCO-content of the solution thus produced amounted to 12.3% NCO.

EXAMPLE 3

354 g of the isomer mixture of 2,2,4- and 2,4,4-trimethylhexamethylenediisocyanate was heated to about 60° C. and reacted a little at a time with stirring in molten dimethylketoxime. The addition of acetone oxime (246 g) was carried out in such a way that the reaction temperature did not exceed 80° C. After the reaction was practically complete, the blocked polyisocyanate was dissolved at about 70° C. in 133 g of n-butylacetate and 267 g of xylene. The content of free isocyanate groups in the solution was 0.15% NCO; that of blocked NCO groups 14.1%.

EXAMPLE 4

464 g of a 75% solution of a biuret group-containing polyisocyanate based on hexamethylenediisocyanate in ethylglycol acetate/xylene (1:1) was diluted with 136 g of xylene and 68 g of ethylglycol acetate and, starting at room temperature, brought gradually to reaction with 132 g of acetoxime.

The solution of this blocked polyisocyanate is characterized by a content of free NCO groups of 0.4% and 9.6% latent isocyanate groups.

C. Lacquer Formulation

In analogy to Example 1, bake-on lacquers were formulated, applied and tested. As polyol component was used the polyester solution described in Example 1.

TABLE 1

| Recipes of Examples 2 to 4 | Example 2 | Example 3 | Example 4 |
|---|---|---|---|
| Polyester solution - Example 1A | 51.2 | 54.0 | 44.9 |
| Solvesso 150 | 4.7 | 4.7 | 6.5 |
| Ethylglycol acetate | 2.3 | 2.3 | 3.2 |
| White pigment TiO$_2$ (rutile) | 22.8 | 21.4 | 24.2 |
| Vehicle | 1.2 | 1.2 | 1.2 |
| Blocked isocyanate - Example 2 | 17.8 | — | — |
| Blocked isocyanate - Comp. Example 3 | — | 16.4 | — |
| Blocked isocyanate - Comp. Example 4 | — | — | 20.0 |

D. Lacquer Testing

Table 2 presents the different hardness test conditions as well as the test data for the hardened lacquer films.

TABLE 2

Test data for the bake-on lacquers described in Examples 2 to 4

| Hardness Test Conditions | FT | HK | HB | G$_{20}$ | G$_{45}$ | G$_{60}$ | EP | GC | T-bend | Lead Pencil Hardness |
|---|---|---|---|---|---|---|---|---|---|---|
| Example 2 310° C., 55 sec | 23 | 165 | 91 | 83 | 55 | 87 | 7.9 | 0 | 0-1 | H |
| Comp. Example 3 300° C., 50 sec | 25 | 120 | 91 | 91 | 64 | 95 | 8.8 | 0 | 0 | HB |
| Comp. Example 4 300° C., 50 sec | 30 | 142 | 100 | 73 | 54 | 89 | 8.6 | 0 | 2 | H |

The comparison Examples 3 and 4 show that the use of aliphatic polyisocyanates is indeed possible in principle but the combination of good surface hardness with high flexibility is not controllable.

EXAMPLE 5

A. Production of a hydroxyl-group-containing polyesters

7 Mol (1163 g) of isophthalic acid, 4 Mol (472 g) of hexanediol-1,6, 2 Mol (236 g) of 3-methylpentanediol-1,5 and 2 Mol (268 g) of 1,1,1-trimethylol propane were subjected to esterification in a 4 l glass flask with addition of 0.1 wt.% of dibutyltin oxide. With increasing temperature a uniform melt was obtained and at about 195° C. the first water separation occurred. Within 8 hours the temperature was raised to 220° C. max. and during 6 more hours at this temperature the esterification went to completion. Then the polyester melt was cooled to about 200° C. and subjected to a vacuum of 20–30 mm Hg for 30–45 minutes to remove volatile components. The bright-yellow transparent polyester is analytically described by an OH-count of 103 mg KOH/g and an acid number of 1 mg KOH/g. A molecular weight determination gave a mean molecular weight of 2500. This polyester was dissolved in a solvent mixture of ethylglycol acetate and Solvesso 150 (1:2) to a 60% solution (Solvesso 150 is a mixture of aromatics with the boiling range of 177°–206° C.).

B. Production of a dimethylketoxime-blocked polyisocyanate

In analogy to the blocked isocyanate adducts described in Examples 1 to 4, 222.1 g of isophoronediisocyanate was dissolved in 80 g of ethylglycol acetate and 151. g of Solvesso 150. Into this solution 124.3 g of dimethylketoxime in solid form was introduced. Due to the exothermic reaction the mixture heated up to 55° C. max. After completion of the reaction the NCO content of the solution was 2.35%. The latent NCO content of this solution of a blocked polyisocyanate was 14.5%.

C. Production of the resin solution and the formulated lacquer 1295 g of the solution of polyester described in A. were mixed with 400 g of the blocked polyisocyanate described in B. in a glass flask and brought to reaction for 60 minutes at 80° C. A bake-on lacquer was formulated according to the following recipe and hardened on a 1 mm thick aluminum sheet.

60.4 wt.% resin solution (see above)
28.5 wt.% white pigment TiO$_2$ (rutile)
3.3 wt.% ethylglycol acetate
6.7 wt.% Solvesso 150
1.1 wt.% vehicle (Base: silicone and high boiling-point esters)

D. Lacquer Testing

Table 3 summarizes the different hardening conditions and test data.

TABLE 3

Hardening conditions and test data for the lacquer described in Example 5

| Hardening Conditions | Laquer Test Data | | | | | | | | | Lead Pencil Hardness |
|---|---|---|---|---|---|---|---|---|---|---|
| | FT | HK | HB | $G_{20}$ | $G_{45}$ | $G_{60}$ | EP | GC | T-bend | |
| 300° C., 45 sec | 20 | 120 | 77 | 90 | 57 | 91 | 9.1 | 0 | 0 | HB |
| 300° C., 50 sec | 20 | 143 | 100 | 82 | 53 | 92 | 9.4 | 0 | 0 | H-2H |
| 300° C., 60 sec | 23 | 137 | 100 | 82 | 55 | 90 | 9.3 | 0 | 0 | H-2H |

With respect to Examples 2 to 5

Explanation of abbreviations used in Tables 1-3
FT = film thickness in μm
HK = König hardness DIN 53 157
HB = Buchholz hardness DIN 53 153
G = Gardner gloss value
EP = Erichsen penetration DIN 53 156
GC = Grid cut DIN 53 151

EXAMPLE 6

A. Production of a hydroxyl-group-containing polyester

In a suitable apparatus 10 Mol (1480 g) of phthalic acid anhydride and 12.5 Mol (1475 g) of hexanediol-1,6 were subjected to esterification. At a temperature of 155° C. a homogeneous melt was obtained and then 3 g of dibutyltin oxide were added as esterification catalyst. Within 6 hours the temperature was continuously raised to 220° C. and the mixture was esterified for another 2½ hours in the temperature range 220°-232° C. Next the polyester melt was cooled to 190° C. and volatile components were removed in a vacuum of 5 Torr for 45 minutes. The analysis of the resultant polyester gave an OH-number of 79 mg KOH/g and an acid number of 1.5 mg KOH/g. This polyester was dissolved to a 60% solution in ethylglycol acetate/Solvesso 150 (1:2).

B. Blocked polyisocyanate 466 g of the trimer of 3-isocyanatomethyl-3,5,5-trimethylcyclohexylisocyanate produced in the known manner were dissolved in 272 g of Solvesso 150 and 136 g of ethylglycol acetate and converted with 146 g of dimethyolketoxime. In the process the temperature of the reaction mixture rose from room temperature to 73° C. max. After the solution had again reached room temperature, the content of free isocyanate was still 0.5 wt.% This solution enters into the calculation of the stoichiometric lacquer formulations with a latent NCO content of 8.4%.

C. Lacquer formulation

With the resins described in A. and B. a polyurethane-white lacquer was formulated, with the pigmenting being carried out in a ball mill.
Recipe for the lacquer:
43.7% polyester solution, see under A
18.5% blocked polyisocyanate, see under B
29.6% white pigment $TiO_2$ (PVK 19)
7.0% ethylglycol acetate/Solvesso 150 (1:2)
1.2% vehicle (silicone resins, dissolved in high boiling-point esters)

This white lacquer was mixed in the proportion of 20:80 with the white lacquer of Example 5 (inclusion of monomeric diisocyanate) and in the usual manner applied to 1 mm thick aluminum sheets and the hardening carried out at 310° C. air temperature. The lacquer was hardened for 50 sec in the blower hotbox with a maximum object temperature of 210° C.

D. Lacquer Testing

Test results:
Film thickness: 23 μm
König hardness (DIN 53 157): 162
Buchholz hardness (DIN 53 153): 100
Lead Pencil hardness: H-2H
Erichsen penetration (DIN 53 156): >7 mm
Grid cut (DIN 53 151): 0
T-bend (ECCA): 0

What is claimed as new and intended to be covered by Letters Patent is:

1. A method for the production of single-component polyurethane lacquers which comprises:
    reacting (1) a polyester having an OH-functionality of at least 2, an OH-count of 70-150 mg KOH/g and a molecular weight of about 800-2500, derived from (A) an acid selected from the group consisting of ortho-, meta-, and para-dicarboxylic acids, 1,2,5-benzenetricarboxylic acid, 1,3,5-benzenetricarboxylic acid, $C_1$-$C_4$ alkyl esters thereof and mixtures thereof and (B) a glycol with a heteroatom-free chain which chain consists of 5-8 C atoms with
    (2) a dimethylketoxime-blocked cycloaliphatic polyisocyanate; wherein the equivalence ratio of said OH groups to said blocked isocyanate group is 1.0:0.7 to 1.0:1.1.

2. The method of claim 1 wherein the ratio of OH groups to said blocked isocyanate groups is 1.0:1.0.

3. The method of claim 1 wherein said glycol has a chain which contains 5-6 C atoms.

4. The method of claim 3 wherein said glycol is selected from the group consisting of 1,5-pentanediol, 1,6-hexanediol, 2,2,4-trimethylhexanediol, 2,4,4-trimethylhexanediol and 3-methylpentanediol.

5. The method of claim 1 wherein the OH count of said polyester is 100 mg KOH/g.

6. The method of claim 1 wherein in addition to said glycol, said polyester is also derived from a trifunctional alcohol.

7. The method of claim 6 wherein said trifunctional alcohol is selected from the group consisting of trimethylolpropane, trimethylolethane triethanolpropane.

8. The method of claim 1 wherein said polyisocyanate is selected from the group consisting of 3,4-hexahydrotoluylenediisocyanate, 2,6-hexahydrotoluylenediisocyanate, o-, m-, and p-hexahydroxylylenediisocyanate, 3-isocyanatomethyl-3,5,5-trimethylcyclohexylisocyanate, 4,4'-dicyclohexylmethanediisocyanate, and mixtures thereof.

9. The method of claim 8 wherein said polyisocyanate is reacted with an OH-group-containing product with at least a functionality of 2, wherein the equivalence ratio of OH:NCO is greater than 1:1.2.

10. The method of claim 9 wherein said equivalence ratio is 1:1.5 to 1:2.

11. The method of claim 8 wherein said polyisocyanate is an adduct formed by reacting a cycloaliphatic polyisocyanate with water.

12. The method of claim 8 wherein said polyisocyanates are selected from the group consisting of dimers, trimers and pentamers of said polyisocyanates.

13. The method of claim 1 wherein said polyurethane lacquers are formulated in a solvent.

14. A single-component duroplastic lacquer composition which comprises:
(1) a polyester having an OH functionality of at least 2, an OH count of 70–150 mg KOH/g and a molecular weight of about 800–2500, derived from (A) an acid selected from the group consisting of ortho-, meta- and para-dicarboxylic acids, 1,2,5-benzenetricarboxylic acid, 1,3,5-benzenetricarboxylic acid, $C_1$–$C_4$ alkyl esters thereof and mixtures thereof and (B) a glycol with a heteroatom-free chain which chain consists of 5–8 carbon atoms, and
(2) a dimethylketoxime-blocked cycloaliphatic polyisocyanate; wherein the equivalence ratio of said OH groups to said blocked isocyanate groups is 1.0:0.7 to 1.0:1.1.

15. The composition of claim 14 wherein the ratio of OH groups to said blocked isocyanate groups is 1.0:1.0.

16. The composition of claim 14 wherein said glycol has a chain which contains 5–6 carbon atoms.

17. The composition of claim 16 wherein said glycol is selected from the group consisting of 1,5-pentanediol, 1,6-hexanediol, 2,2,4-trimethylhexanediol, 2,4,4-trimethylhexanediol and 3-methylpentanediol.

18. The composition of claim 14 wherein the OH functionality of said polyester is 100 mg KOH/g.

19. The composition of claim 14 wherein in addition to said glycol, said polyester is derived from a trifunctional alcohol.

20. The composition of claim 19 wherein said trifunctional alcohol is selected from the group consisting of trimethylolpropane, trimethylolethane and triethanolpropane.

21. The composition of claim 14 wherein said polyisocyanate is selected from the group consisting of 3,4-hexahydrotoluylenediisocyanate, 2,6-hexahydrotoluylenediisocyanate, o-xylylenediisocyanate, m-xylylenediisocyanate, p-xylylenediisocyanate, 3-isocyanatomethyl-3,5,5-trimethylcyclohexyldiisocyanate, 4,4'-dicyclohexylmethanediisocyanate, and mixtures thereof.

22. The composition of claim 21 wherein said polyisocyanate is reacted with an OH-group-containing product with at least a functionality of 2, wherein the equivalence ratio of OH:NCO is greater than 1:1.2.

23. The composition of claim 22 wherein said OH group containing product is water.

24. The composition of claim 21 wherein said polyisocyanates are selected from the group consisting of dimers, trimers and pentamers of said polyisocyanates.

25. The composition of claim 14 which further comprises a solvent.

* * * * *